(12) United States Patent
Munakata et al.

(10) Patent No.: US 8,366,340 B2
(45) Date of Patent: Feb. 5, 2013

(54) STRUCTURAL MEMBER JOINT STRUCTURE

(75) Inventors: Takeshi Munakata, Shizuoka (JP); Eiji Kashiwagi, Shizuoka (JP); Nobuyuki Osada, Shizuoka (JP)

(73) Assignee: SUS Co., Ltd., Shizuoka-shi, Shizuoka (JP)

( * ) Notice: Subject to any disclaimer, the term of this patent is extended or adjusted under 35 U.S.C. 154(b) by 184 days.

(21) Appl. No.: 12/734,456

(22) PCT Filed: Oct. 29, 2008

(86) PCT No.: PCT/JP2008/069658
§ 371 (c)(1),
(2), (4) Date: May 3, 2010

(87) PCT Pub. No.: WO2009/057644
PCT Pub. Date: May 7, 2009

(65) Prior Publication Data
US 2010/0229496 A1    Sep. 16, 2010

(30) Foreign Application Priority Data
Nov. 2, 2007   (JP) .................................. 2007-285882

(51) Int. Cl.
*B25G 3/00*    (2006.01)
*B25G 3/20*    (2006.01)
(52) U.S. Cl. ..................... 403/255; 403/374.3; 403/231
(58) Field of Classification Search .......... 403/252–257, 403/374.1–374.4, 231, 239, 248, 264; 52/705, 52/282.1, 282.3, 282.4, 655.1, 656.9
See application file for complete search history.

(56) References Cited

U.S. PATENT DOCUMENTS 3,695,649 A * 10/1972 Laverone ....................... 403/231
4,549,832 A * 10/1985 Sterl ............................. 403/264
(Continued)

FOREIGN PATENT DOCUMENTS

JP      60-1410         1/1985
JP      1-115019        8/1989
(Continued)

*Primary Examiner* — Daniel P. Stodola
*Assistant Examiner* — Matthew R McMahon
(74) *Attorney, Agent, or Firm* — McGinn IP LAW Group, PLLC

(57) ABSTRACT

A structural member joint structure can easily join members to each other by using a simple structure having a reduced number of parts and can provide the members with a large fastening force which makes the members less likely to be loosened from each other. The joint structure is used to join one pillar and the other pillar to each other such that the other member is vertically abutted against a side face of the one pillar. The structure has a pair of fastening members positioned in the inside of the other pillar and arranged so as to be movable in the widthwise direction of a groove formed in a side face of the one pillar, a nut mechanism located on the inward side of the other pillar and formed between the pair of fastening members, and a bolt operated from the outside through an opening in the other pillar to be fitted into the nut mechanism. Rotating the bolt causes the nut mechanism to urge and move the pair of fastening members in the direction in which the pair is separated from each other. This causes engagement projections respectively arranged on ends of the pair of fastening members to engage with engagement recesses respectively arranged at lateral opposite ends of the groove in the one pillar. Thus, the pillars are joined to each other.

12 Claims, 12 Drawing Sheets

U.S. PATENT DOCUMENTS

| | | | | |
|---|---|---|---|---|
| 4,556,337 A * | 12/1985 | Marshall | ............ | 403/255 |
| 4,799,819 A * | 1/1989 | Swoboda | ............ | 403/252 |
| 4,955,742 A * | 9/1990 | Marks | ............ | 403/246 |
| 5,209,598 A * | 5/1993 | Zullig | ............ | 403/255 |
| 6,764,245 B2 * | 7/2004 | Popovski | ............ | 403/256 |
| 6,837,646 B1 * | 1/2005 | Minger | ............ | 403/374.4 |
| 6,960,045 B2 * | 11/2005 | Schmalzhofer | ............ | 403/252 |
| 2004/0120759 A1 * | 6/2004 | Altman | ............ | 403/374.3 |

FOREIGN PATENT DOCUMENTS

| | | |
|---|---|---|
| JP | 5-57411 | 7/1993 |
| JP | 2002-61302 | 2/2002 |
| JP | 2002-106072 | 4/2002 |
| JP | 2007-154924 | 6/2007 |
| JP | 2009-114645 | 5/2009 |

* cited by examiner

STRUCTURAL MEMBER JOINT STRUCTURE

TECHNICAL FIELD

The present invention relates to a structural member joint structure for joining, for example, one pillar and another pillar to each other, in a form that the end face of other pillar is vertically abutted against a side face of the one pillar. In particular, the present invention relates to the structural member joint structure, which can easily join members to each other by using a simple structure having a reduced number of parts, and which can provide the members with a large fastening force so as to make the members less likely to be loosened from each other.

BACKGROUND ART

When joining one pillar and a second (or an other separate) pillar to each other, for example, in a form that an end face of the second pillar is vertically abutted against a side face of the one pillar, there has been a structure in which the end face of the second pillar is first abutted against a side face of the one pillar, and at the corners of the abutted position, substantially triangular shape of brackets are attached and fixed by fastening screws.

There has been another joint structure, in which a dovetail joint groove has been formed in the one pillar, and a joint body, of which end part elongates away from the dovetail joint groove, is engaged with the dovetail joint groove. Then, the end face of the second pillar is abutted against the side face of the one pillar, and the end part of the joint body is fixed by fastening screws at a predetermined position in the dovetail joint groove of the second pillar.

SUMMARY OF THE INVENTION

Problems to be Solved by Invention

The prior arts as disclosed above have the following problems.

First, with reference to the first prior art, for using one bracket, the one pillar and also the other pillar respectively require the fastening screws, thus a large number of fastening screws must be used. In addition, such large number of fastening screws should be fastened by using any joining tool, which would require laborious and time-wasting work.

Further, according to the first prior art, the fastening of brackets should be done by maintaining the state that the end face of the other pillar is abutted against the side face of the one pillar. Thus the state of each pillar is unstable, which would cause poor work efficiency.

Also, with reference to the second prior art, the fastening of joint body should be done by maintaining the state that the end face of the other pillar is abutted against the side face of the one pillar, and the state of each pillar is still unstable, which would cause poor work efficiency.

There has been several other prior arts for solving the problems as discussed above, for example, such as those disclosed in Patent Document 1 and Patent Document 2, each of which application has been filed by the applicant of the present invention:

Patent Document 1: Japanese Unexamined Patent Publication No. 2002-61302
Patent Document 2: Japanese Unexamined Patent Publication No. 2007-154924

In the light of the above problems as discussed above, it is an object of the present invention to provide the structural member joint structure, which can easily join members to each other by using a simple structure having a reduced number of parts, and which can provide the members with a large fastening force so as to make the members less likely to be loosened from each other.

Means to Solve the Problem

To achieve the objects mentioned above, according to claim 1 of the present invention, there is a structural member joint structure for joining one pillar and another pillar to each other, in a form that the other pillar is vertically abutted against a side face of the one pillar, comprising, a pair of fastening members positioned in the inside of the other pillar and arranged so as to be movable in the widthwise direction of a groove formed in a side face of the one pillar; a nut mechanism positioned in the inside of the other pillar and also positioned between the pair of fastening members; and a bolt operated from the outside through an opening formed in the other pillar to be engaged with the nut mechanism. When the bolt rotates, the nut mechanism forces and moves the pair of fastening members in the direction in which the pair of fastening members is separated from each other, whereby engage projections, respectively arranged on ends of the pair of fastening members, move to be engaged with engagement recesses respectively arranged at widthwise opposite ends of the groove in the one pillar, so as join the one pillar and the other pillar to each other.

According to claim 2 of the present invention, there is the structural member joint structure of claim 1, further characterized in that, the nut mechanism is composed of a pair of intermediate forcing members, positioned in the inside of the other pillar and also positioned between the pair of fastening members, respectively having taper surfaces facing to a pair of taper surfaces of each of the pair of fastening members, and also having another taper surface so as to be facing to each other oppositely; and a nut, positioned between the pair of intermediate forcing members, and having a pair of taper surfaces respectively facing to the other taper surface of each of the pair of intermediate forcing members. When the nut moves closer to the bolt by engagement of the bolt with the nut, a force is applied to the pair of intermediate forcing members to move in the direction in which the pair of intermediate forcing members is separated from each other through interaction between the taper surfaces of the nut and the taper surfaces of the pair of intermediate forcing members. Also, the movement of the pair of intermediate forcing members in the direction to be separated from each other, forces the pair of fastening members to move in the direction in which the pair of fastening members is separated from each other through interaction between the taper surfaces of the pair of intermediate forcing members and the taper surfaces of the pair of fastening members.

According to claim 3 of the present invention, there is the structural member joint structure as claimed in claim 2, further characterized in that, the pair of intermediate forcing members moves in the lengthwise direction along the other pillar, whereby the pair of fastening members moves in the widthwise direction along the groove.

According to claim 4 of the present invention, there is the structural member joint structure as claimed in claim 2 or claim 3, further characterized in that, each of the pair of intermediate forcing members has guide grooves, and the nut has guides to be in movable engagement with the guide grooves.

According to claim 5 of the present invention, there is the structural member joint structure as claimed in any one claim among claim 2 through claim 4, further characterized in that, each of the pair of fastening members has concave part, and the taper surfaces have been formed in the inside of the concave part, and the pair of intermediate forcing members and the nut are incorporated in the concave part.

According to claim 6 of the present invention, there is the structural member joint structure as claimed in claim 1, further characterized in that, the nut mechanism is composed of a pair of nuts positioned in the inside of the other pillar and also positioned between the pair of fastening members, in a form that a taper surface of each of nuts is oppositely facing to each other. When the bolt rotates, the pair of nuts moves in the outward direction through interaction of the taper surfaces of the pair of nuts, which forces the pair of fastening members, positioned at the outside thereof, to move in the direction in which the pair of fastening members is separated from each other.

According to claim 7 of the present invention, there is the structural member joint structure as claimed in claim 6, further characterized in that, the pair of nuts are positioned accumulatively in the axial direction of the bolt, in a form that respective taper surface is in tight contact with each other, and through engagement rotation of the bolt, the nut on the removed side from the bolt moves closer to the side of the bolt, whereby the pair of nuts moves in the outward direction, and the pair of fastening members, positioned at the outside thereof, moves in the direction in which the pair of fastening members is separated from each other.

And according to claim 8 of the present invention, there is the structural member joint structure as claimed in claim 6 or claim 7, further characterized in that, each of the pair of fastening members has an attachment recess for attaching the pair of nuts.

Effect of the Invention

As discussed above, according to the structural member joint structure of claim 1 of the present invention, the structural member joint structure for joining one pillar and another pillar to each other, in a form that the other pillar is vertically abutted against a side face of the one pillar, is provided with: a pair of fastening members positioned in the inside of the other pillar and arranged so as to be movable in the widthwise direction of a groove formed in a side face of the one pillar; a nut mechanism positioned in the inside of the other pillar and also positioned between the pair of fastening members; and a bolt operated from the outside through an opening formed in the other pillar to be engaged with the nut mechanism. The rotating of the bolt causes the nut mechanism to force and move the pair of fastening members in the direction in which the pair of fastening members is separated from each other, whereby engage projections, respectively arranged on ends of the pair of fastening members, move to be engaged with engagement recesses respectively arranged at widthwise opposite ends of the groove in the one pillar, so as join the one pillar and the other pillar to each other. Accordingly, a desired joint state can be obtained by using less number of parts. In particular, the desired joint state can be obtained by using the pair of fastening members, the nut mechanism and the bolt, which may contribute to easier parts management and lower cost.

The nut and the bolt have been engaged with each other, and the pair of fastening members is placed on the groove, and they are concealed by the other pillar. And then, a desired joint state can be obtained by simple rotation of the bolt through the opening of the other pillar. Thus the joint work may be facilitated, and the reduction of labor and time can be accomplished.

Further, the nut and the bolt have been engaged with each other, and the pair of fastening members is placed on the groove, and they are concealed by the other pillar. Thus the stable condition during joint work can be secured.

The function of the nut mechanism, as well as the engagement of the engagement projections of the pair of fastening members with the engagement recesses of the groove, serve for strong joint state to each other.

According to the structural member joint structure of claim 2, in regard to the structural member joint structure of claim 1, the nut mechanism is composed of a pair of intermediate forcing members, positioned in the inside of the other pillar and also positioned between the pair of fastening members, respectively having taper surfaces facing to a pair of taper surfaces of each of the pair of fastening members, and also having another taper surface so as to be facing to each other oppositely. The nut mechanism is also composed of a nut, positioned between the pair of intermediate forcing members, and having a pair of taper surfaces respectively facing to the other taper surface of each of the pair of intermediate forcing members. When the nut moves closer to the bolt by engagement of the bolt with the nut, a force is applied to the pair of intermediate forcing members to move in the direction in which the pair of intermediate forcing members is separated from each other through interaction between the taper surfaces of the nut and the taper surfaces of the pair of intermediate forcing members. Also, the movement of the pair of intermediate forcing members in the direction to be separated from each other, forces the pair of fastening members to move in the direction in which the pair of fastening members is separated from each other through interaction between the taper surfaces of the pair of intermediate forcing members and the taper surfaces of the pair of fastening members. Thus the effect as discussed above may surely be obtained.

According to the structural member joint structure of claim 3, in regard to the structural member joint structure of claim 2, the pair of intermediate forcing members moves in the lengthwise direction along the other pillar, whereby the pair of fastening members moves in the widthwise direction along the groove. Thus the effect as discussed above may surely be obtained.

According to the structural member joint structure of claim 4, in regard to the structural member joint structure of claim 2 or claim 3, each of the pair of intermediate forcing members has guide grooves, and the nut has guides to be in movable engagement with the guide grooves. Therefore, it is possible to prevent any misalignment of the pair of intermediate forcing members and the nut, whereby the joint work may be facilitated.

According to the structural member joint structure of claim 5, in regard to the structural member joint structure of any one claim among claim 2 through claim 4, each of the pair of fastening members has concave part, and the taper surfaces have been formed in the inside of the concave part, and the pair of intermediate forcing members and the nut are incorporated in the concave part. Therefore, the prevention of misalignment, as well as the facilitated joint work, may be accomplished.

According to the structural member joint structure of claim 6, in regard to the structural member joint structure of claim 1, the nut mechanism is composed of a pair of nuts positioned in the inside of the other pillar and also positioned between the pair of fastening members, in a form that a taper surface of each of nuts is oppositely facing to each other. When the bolt rotates, the pair of nuts moves in the outward direction through interaction of the taper surfaces of the pair of nuts, which forces the pair of fastening members, positioned at the outside thereof, to move in the direction in which the pair of fastening members is separated from each other. Thus the effect of claim 1 as discussed above may be obtained securely, and the number of required parts may be reduced still further.

Acceding to the structural member joint structure of claim 7, in regard to the structural member joint structure of claim 6, the pair of nuts are positioned accumulatively in the axial direction of the bolt, in a form that respective taper surface is in tight contact with each other, and through engagement rotation of the bolt, the nut on the removed side from the bolt moves closer to the side of the bolt, whereby the pair of nuts moves in the outward direction, and the pair of fastening members, positioned at the outside thereof, moves in the direction in which the pair of fastening members is separated from each other. Thus the above effect may be obtained securely.

And according the structural member joint structure of claim 8, in regard to the structural member joint structure of claim 6 or claim 7, each of the pair of fastening members has an attachment recess for attaching the pair of nuts. Therefore, the prevention of misalignment, as well as the facilitated joint work, may be accomplished.

EXPLANATION OF REFERENCE NUMERALS AND SIGNS

Figure 1:
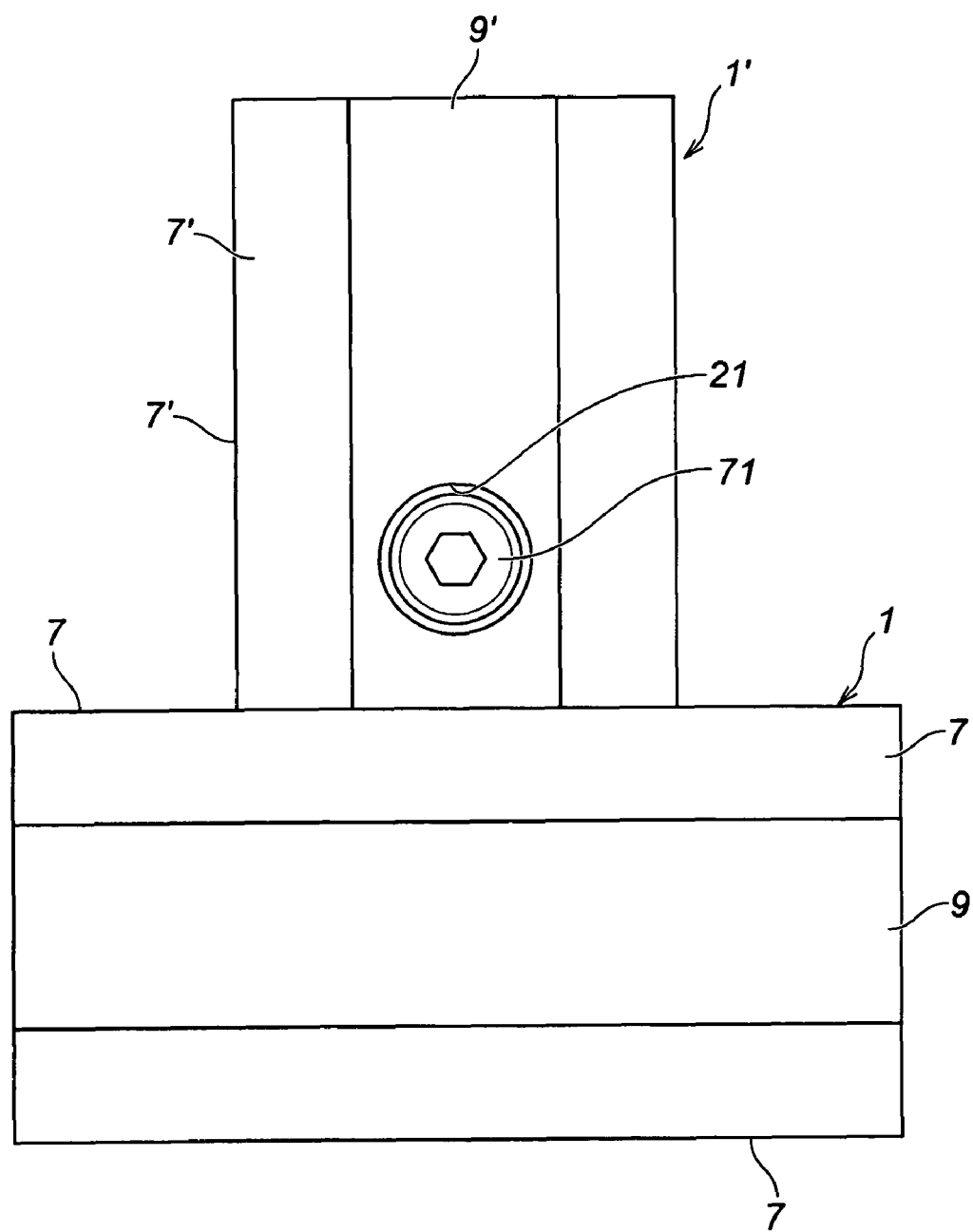
FIG. 1 A front view showing a joint state in which an end face of another pillar has been abutted against a side face of one pillar, according to a first embodiment of the present invention.
Figure 2:
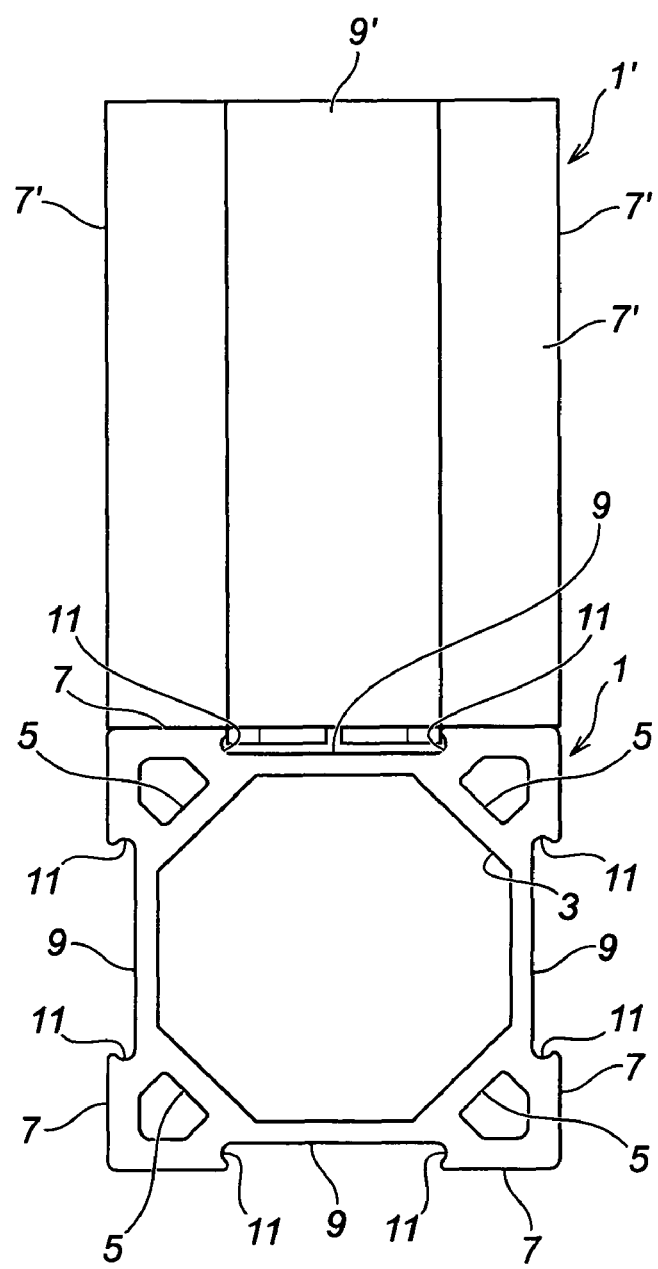
FIG. 2 A side view showing the joint state in which the end face of the other pillar has been abutted against the side face of the one pillar, according to the first embodiment of the present invention.

1 one pillar
7 side face
9 groove
11 engagement recess
1' one pillar
7' side face
9' groove
11' engagement recess
21 opening
31 intermediate forcing member
33 guide groove
35 taper surface
39 taper surface
41 nut
43 guide
45 taper surface
47 female screw
51 fastening member
53 concave part
55 taper surface
65 engagement projection
71 bolt
101 one pillar
107 side face
109 groove
111 engagement recess
101' one pillar
107' side face
109' groove
111' engagement recess
123 fastening member
127 engagement projection
131 nut
133 taper surface
139 bolt

BEST MODE FOR CARRYING OUT THE INVENTION

A first embodiment of the present invention will now be discussed with reference to FIG. 1 through FIG. 6. There is one pillar 1, and the cross section shape of the one pillar 1 is substantially square, of which center is hollow. Accordingly, there is a cavity 3 at the center of the one pillar 1. The cavity 3 has been formed elongating in the lengthwise direction of the one pillar 1. There are other cavities 5, formed respectively at four corners of the one pillar 1 as seen from the cross section. These four cavities 5 have also been formed elongating in the lengthwise direction of the one pillar 1.

The one pillar 1 has four side faces 7, each of which having a respective groove 9. There are engagement recesses 11, 11 formed at the both ends in the widthwise direction of the groove 9.

Another pillar 1' is vertically abutted against any one side face 7 selected arbitrarily, of the one pillar 1, so that each pillar may join to each other. The other pillar 1' has the same shape as that of the one pillar 1 discussed above, and the same reference numerals, with additional marking ('), are used for the same parts in the drawings. There is an opening 21 in one specified groove 9' of the other pillar 1', and a bolt (discussed hereinafter) is operated through this opening 21.

Figure 3:
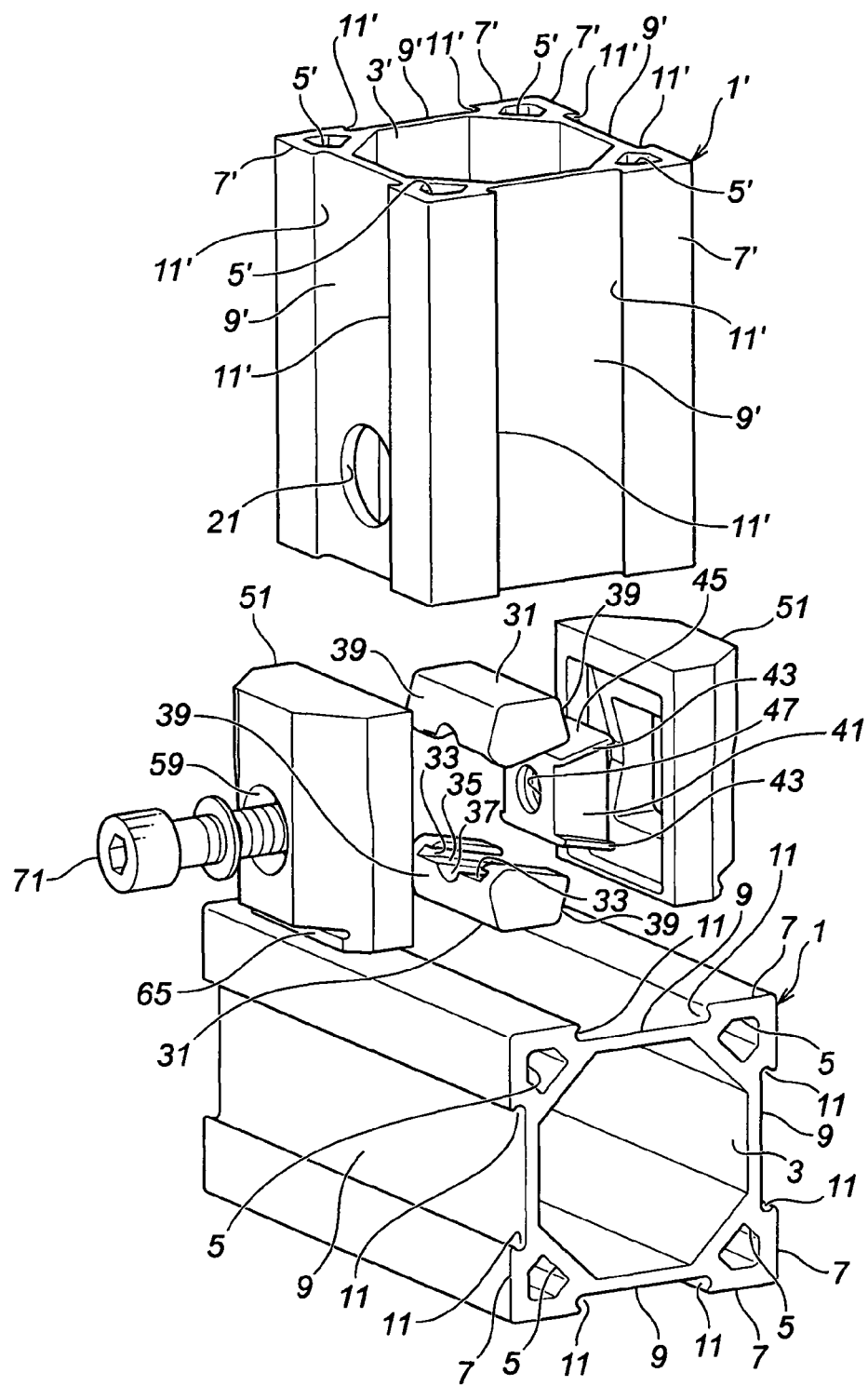
FIG. 3 An exploded perspective view showing the joint state in which the end face of the other pillar has been abutted against the side face of the one pillar, according to the first embodiment of the present invention.

There is a pair of intermediate forcing members 31, 31, respectively positioned at the upper part and the lower part of FIG. 3, on the one side face 7 selected arbitrarily, of the one pillar 1. There are guide grooves 33, 33, formed in one intermediate forcing member 31, among the pair of intermediate forcing members 31, 31. Similarly, there are also guide grooves 33, 33, formed in the other intermediate forcing member 31. A taper surface 35 has been formed between the guide grooves 33, 33. Also, there is a recess 37 having semi-circular cross sectional shape on the taper surface 35. Further, there are other taper surfaces 39, 39 formed on the outer surface of one intermediate forcing member 31 among the pair of intermediate forcing members 31, 31. Similarly, the other intermediate forcing member 31 also has taper surfaces 39, 39 formed on the outer surface thereof.

There is a nut 41 positioned between the pair of intermediate forcing members 31, 31. The nut 41 has guides 43, 43, 43, 43 engaged to be movable with guide grooves 33, 33, formed on the pair of intermediate forcing members 31, 31 respectively. The upper and lower surfaces of the nut 41 as seen by the drawings respectively form taper surfaces 45, 45. These taper surfaces 45, 45 are positioned to face oppositely to the taper surfaces 35, 35 of the pair of intermediate forcing members 31, 31 discussed above. There is a female screw 47 formed on the nut 41.

Figure 6:
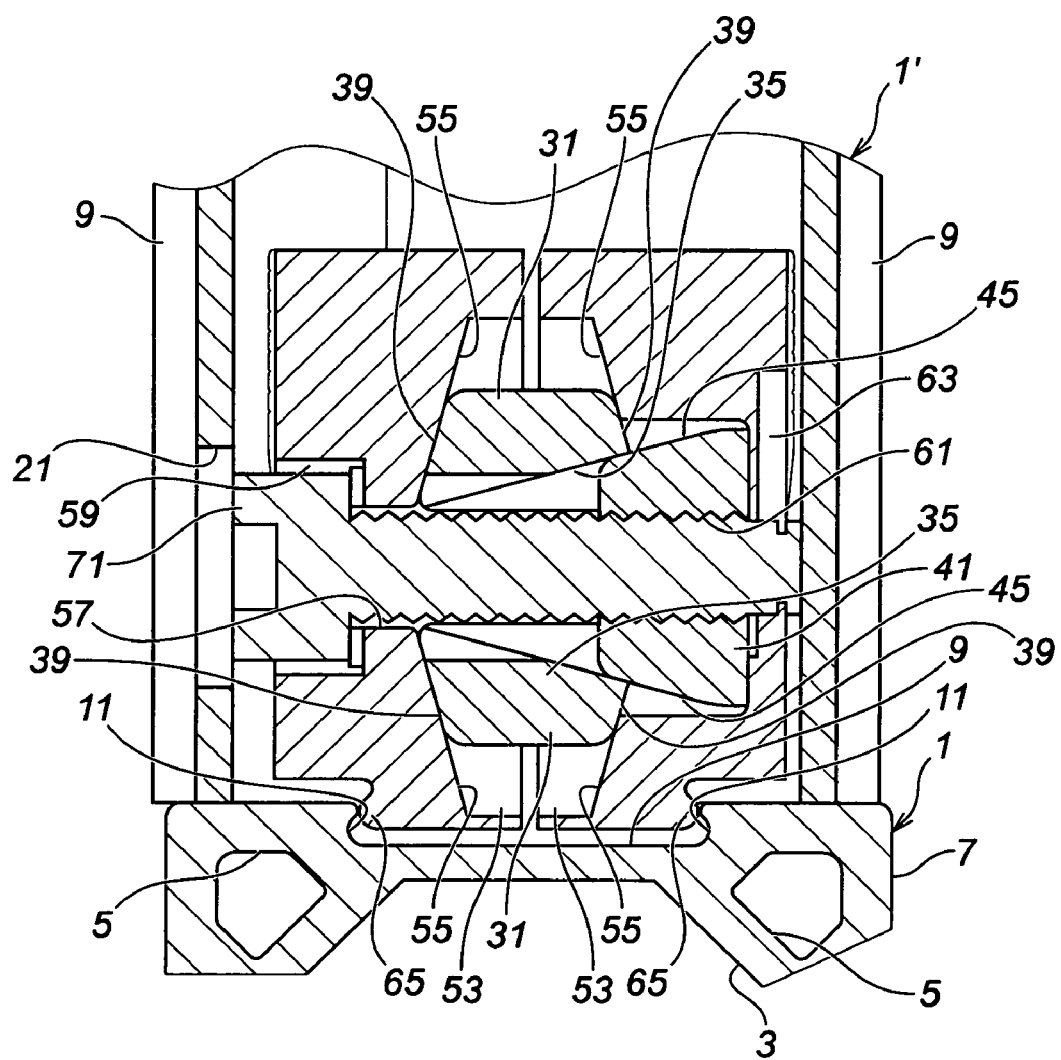
FIG. 6 A front section view showing the joint state in which the end face of the other pillar has been abutted against the side face of the one pillar, and also showing a function, according to the first embodiment of the present invention.

There is a pair of fastening members 51, 51, positioned to sandwich the pair of intermediate forcing members 31, 31, from the right side and the left side as seen in FIG. 3. As illustrated in FIG. 6, the pair of fastening members 51, 51 respectively has concave parts 53, 53. The concave part 53 has taper surfaces 55, 55. The taper surfaces 55, 55 are positioned to face oppositely to the taper surfaces 39, 39, respectively, of the pair of intermediate forcing members 31, 31 discussed above.

Among the pair of fastening members 51, 51, one fastening member 51 positioned on the left side of FIG. 6 has a penetration hole 57, and there is a recess 59 having a larger diameter and formed at the outer side of the penetration hole 57. On the other hand, among the pair of fastening members 51, 51, the other fastening member 51 on the right side of FIG. 6 has a penetration hole 61, and there is a recess 63 having a larger diameter formed at the outer side of the penetration hole 61. There are engagement projections 65, 65, formed at the outer bottom parts of the pair of fastening members 51, 51 as seen in FIG. 6.

There is a bolt 71, and this bolt 71 is engaged with the female screw 47 of the nut 41, penetrating through the recess 59 of one fastening member 51 positioned on the left side of FIG. 6 among the pair of fastening members 51, 51, the penetration hole 57, and the recesses 37, 37 of the pair of intermediate forcing members 31, 31. The engagement of the bolt 71 with the nut 41 forces the nut 41 to move closer to the bolt 71. Accordingly, through interaction between the pair of taper surfaces 45, 45 of the nut 41, and the taper surfaces 35, 35 of the pair of intermediate forcing members 31, 31, a force is applied to the pair of intermediate forcing members 31, 31 to move in the direction so that the pair of intermediate forcing members 31, 31 is away from each other (to move in the upward and the downward directions of FIG. 3 and FIG. 6). When the pair of intermediate forcing members 31, 31 moves, through interaction between the respective taper surfaces 39, 39 of the intermediate forcing members 31, 31, and the respective taper surfaces 55, 55 of the pair of fastening members 51, 51, a force is applied to the pair of fastening members 51, 51 to move in the direction so that the pair of fastening members 51, 51 is away from each other (in the widthwise direction of the groove 9).

The function of the first embodiment will now be explained with reference to the structure as discussed above.

Figure 4:
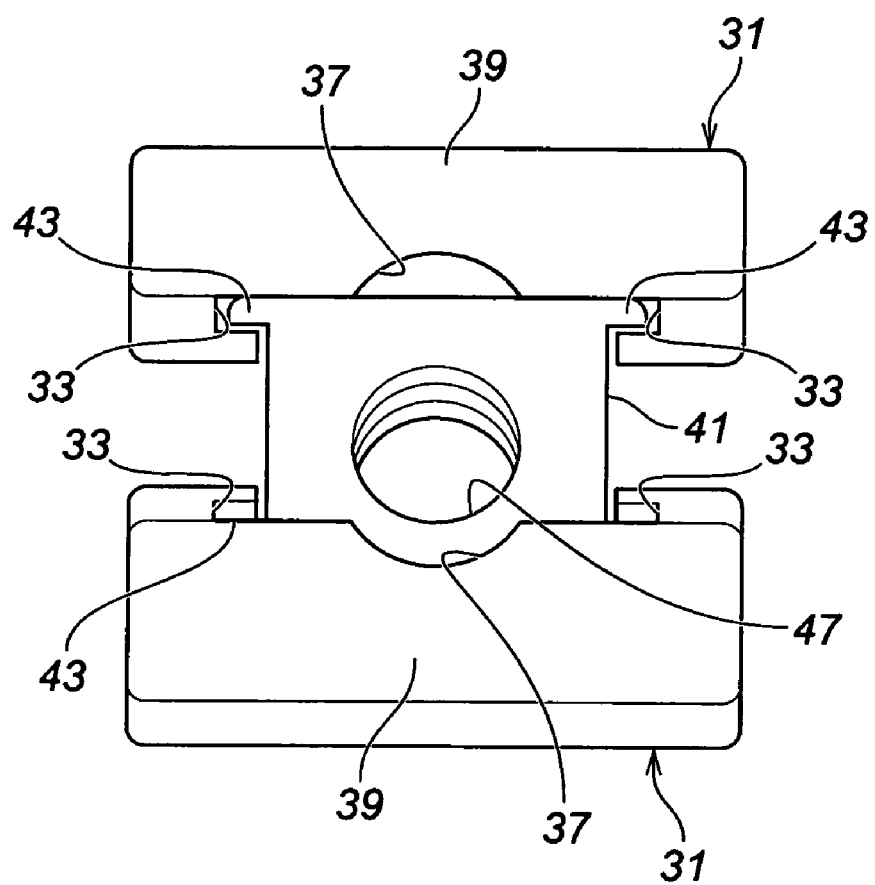
FIG. 4 A front view showing a state that a pair of intermediate forcing members and a nut have been assembled, according to the first embodiment of the present invention.
Figure 5:
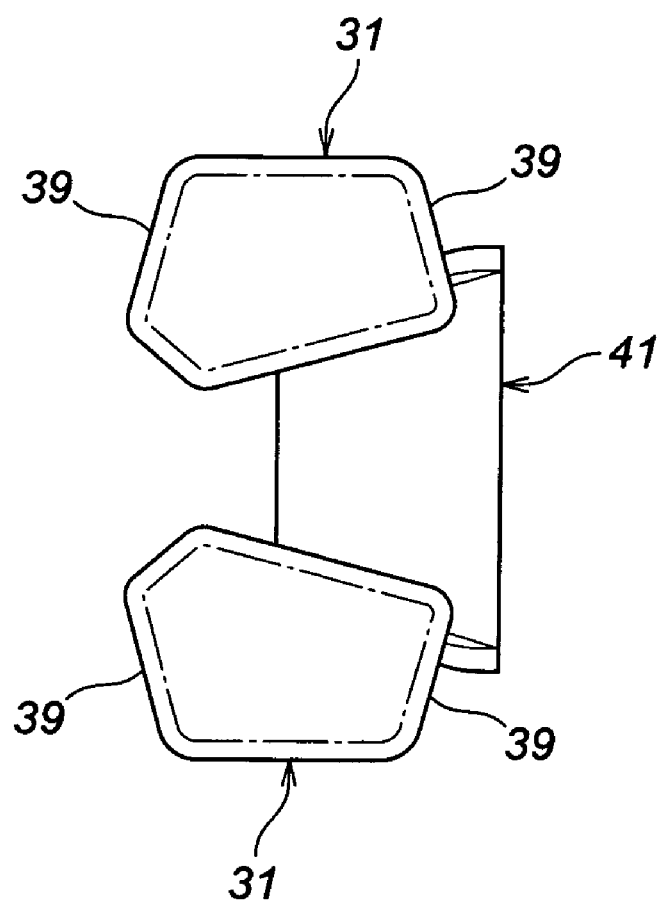
FIG. 5 A side view showing the state that the pair of intermediate forcing members and the nut have been assembled, according to the first embodiment of the present invention.

First, as illustrated in FIG. 4 and FIG. 5, the pair of intermediate forcing members 31, 31 and the nut 41 are assembled. Namely, the guides 43, 43 formed on the nut 41 become in engagement with the guide grooves 33, 33 formed on the pair of intermediate forcing members 31, 31 respectively, whereby an assembly shown in FIG. 4 and FIG. 5 is obtained.

Then, as illustrated in FIG. 3, this assembly is placed on the groove 9 of the one pillar 1, and also the pair of fastening members 51, 51 is placed on this groove 9 of the one pillar 1. In this state, the other pillar 1' is placed. When the other pillar 1' is placed, the above assembly and the pair of fastening members 51, 51 are concealed in the other pillar 1'.

Thereafter, the bolt 71 is inserted via the penetration hole 21 of the other pillar 1', to be engaged with the female screw 47 of the nut 41, through the recess 59 of one fastening member 51 positioned on the left side of FIG. 6 among the pair of fastening members 51, 51, the penetration hole 57, and the recesses 37, 37 of the pair of intermediate forcing members 31, 31. The engagement of the bolt 71 with the nut 41 forces the nut 41 to move closer to the bolt 71. Accordingly, through interaction between the pair of taper surfaces 45, 45 of the nut 41, and the taper surfaces 35, 35 of the pair of intermediate forcing members 31, 31, a force is applied to the pair of intermediate forcing members 31, 31 to move in the direction so that the pair of intermediate forcing members 31, 31 is away from each other (to move in the upward and the downward directions of FIG. 3 and FIG. 6). When the pair of intermediate forcing members 31, 31 moves, through interaction between the respective taper surfaces 39, 39 of the intermediate forcing members 31, 31, and the respective taper surfaces 55, 55 of the pair of fastening members 51, 51, a force is applied to the pair of fastening members 51, 51 to move in the direction so that the pair of fastening members 51, 51 is away from each other (in the widthwise direction of the groove 9).

Thus the engagement projections 65, 65 of the pair of fastening members 51, 51 become in engagement with the engagement recesses 11, 11 of the groove 9, whereby the strong joint state can be obtained.

The present embodiment has the following merits.

First, a desired joint state can be obtained by using less number of parts. In particular, the desired joint state can be obtained by using the pair of intermediate forcing members 31, 31, the nut 41, the pair of fastening members 51, 51, and the bolt 71, which may contribute to easier parts management and lower cost.

The pair of intermediate forcing members 31, 31, the nut 41, and the pair of fastening members 51, 51, have been placed on the groove 9, and concealed by the other pillar 1', and then, a desired joint state can be obtained by simple engagement of the bolt 71 through the opening 21 of the other pillar 1'. Thus the joint work may be facilitated, and the reduction of labor and time can be accomplished.

Further, because the pair of intermediate forcing members 31, 31, the nut 41, and the pair of fastening members 51, 51 are placed on the groove 9, and concealed by the other pillar 1', the stable condition during joint work can be secured.

The engagement of the engagement projections 65, 65 of the pair of fastening members 51, 51, with the engagement recesses 11, 11 of the groove 9, serves for strong joint state to each other.

The pair of intermediate forcing member 31, 31 and the nut 41 are assembled by engagement of the guide grooves 33, 33 with the guides 43, 43. Therefore, it is possible to prevent any misalignment of each part, whereby sufficient stability during joint work can be secured.

There are two positions, namely at the upper position and the lower position of FIG. 6, where the respective force is applied to the pair of fastening members 51, 51. Thus, it is possible to prevent the pair of fastening members 51, 51 from being tilted or deflected.

A second embodiment of the present invention will now be discussed with reference to FIG. 7 through FIG. 12. There is one pillar 101, and the cross section shape of the one pillar 101 is substantially square, of which center is hollow. Accordingly, there is a cavity 103 at the center of the one pillar 101. The cavity 103 has been formed elongating in the lengthwise direction of the one pillar 101. There are other cavities 105, formed respectively at four corners of the one pillar 101 as seen from the cross section. These four cavities 105 have also been formed elongating in the lengthwise direction of the one pillar 101.

The one pillar 101 has four side faces 107, each of which having a respective groove 109. There are engagement recesses 111, 111 formed at the both ends in the widthwise direction of the groove 109.

Another pillar 101' is vertically abutted against any one side face 107 selected arbitrarily, of the one pillar 101, so that each pillar may join to each other. The other pillar 101' has the same shape as that of the one pillar 101 discussed above, and the same reference numerals, with additional marking ('), are used for the same parts in the drawings. There is an opening 121 in one specified groove 109' of the other pillar 101', and a bolt (discussed hereinafter) is operated through this opening 121.

Figure 9:
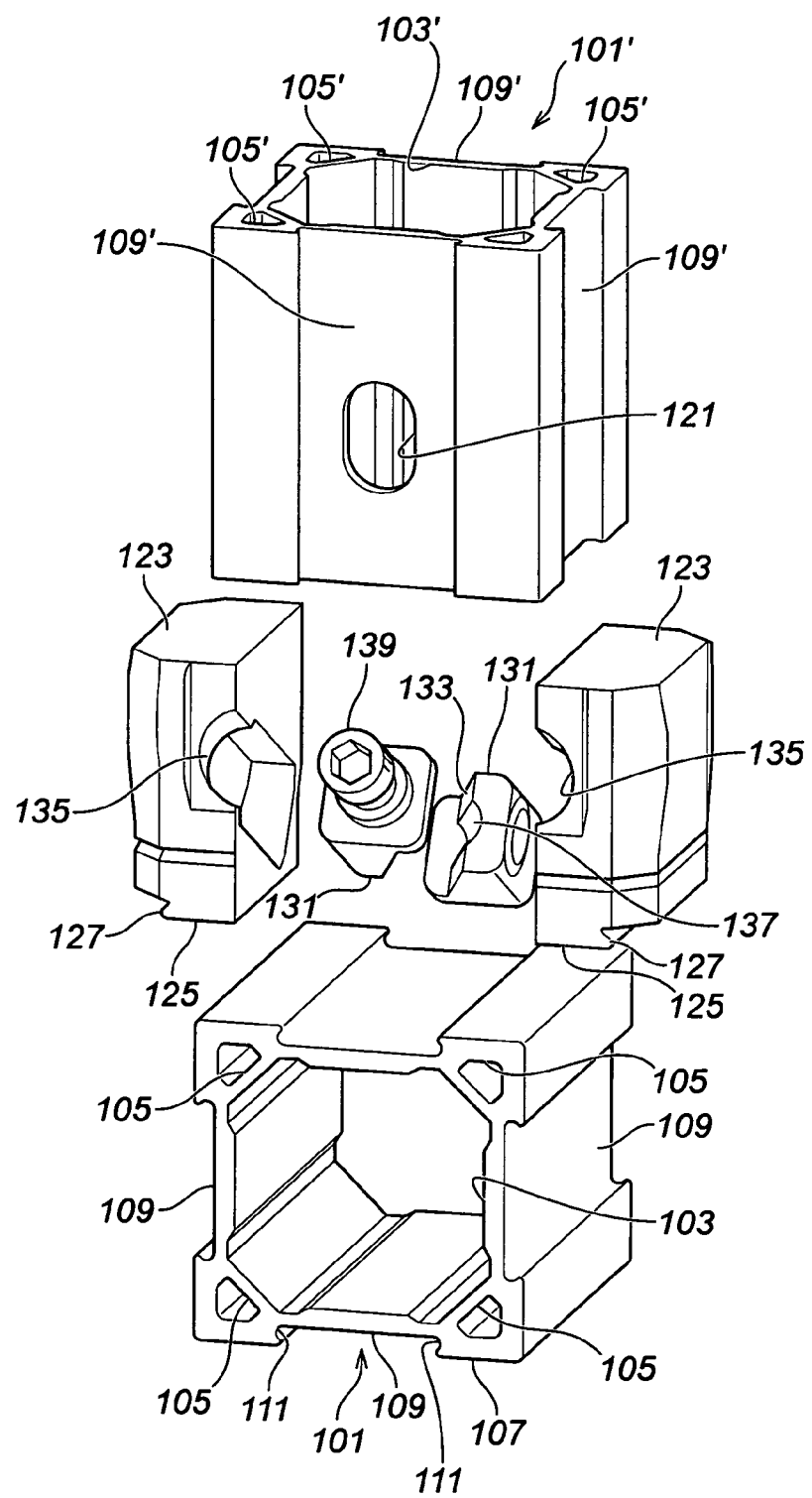
FIG. 9 An exploded perspective view showing the joint state in which the end face of the other pillar has been abutted against the side face of the one pillar, according to the second embodiment of the present invention.
Figure 10:
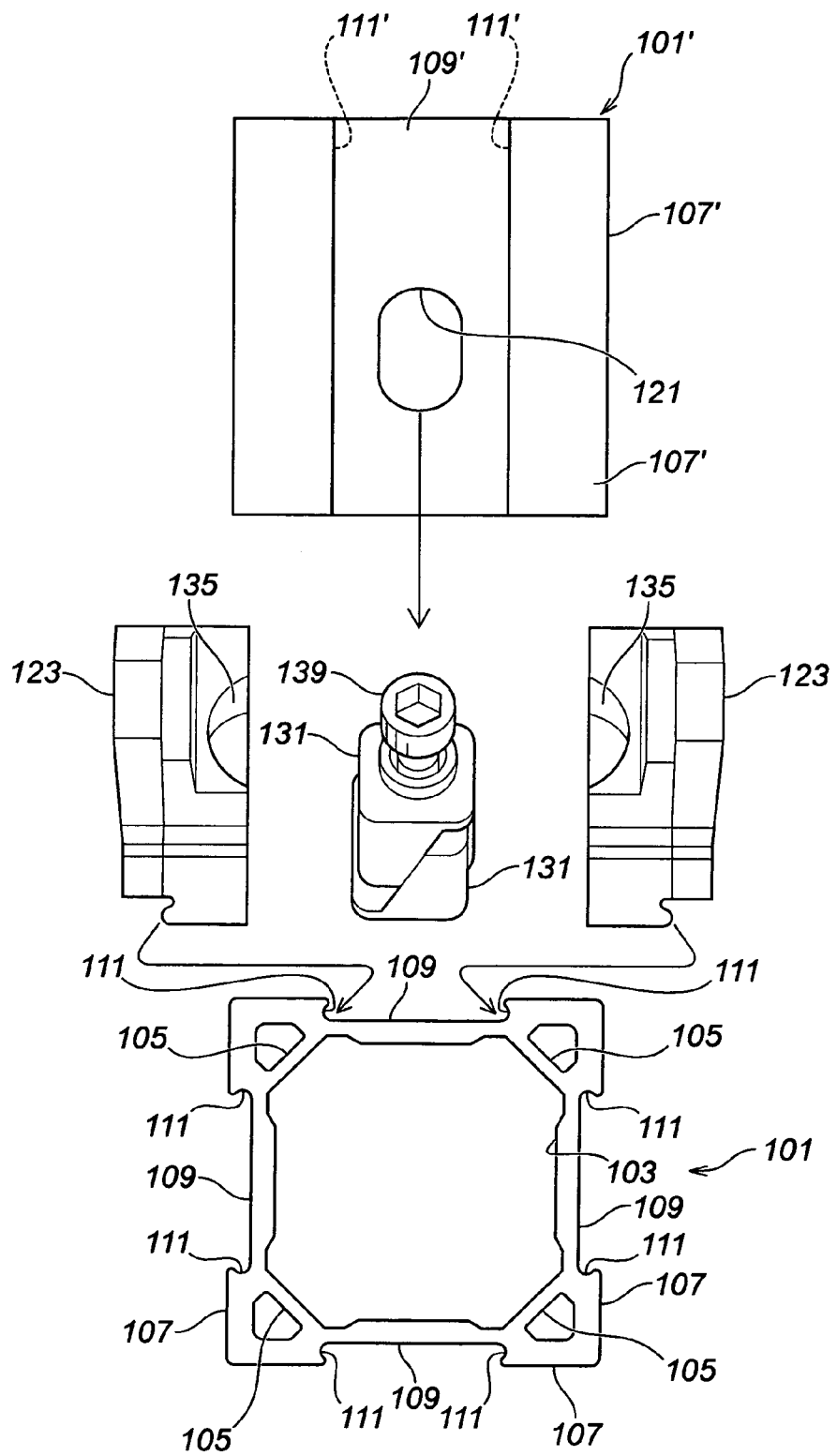
FIG. 10 An exploded front view showing the joint state in which the end face of the other pillar has been abutted against the side face of the one pillar, according to the second embodiment of the present invention.
Figure 12:
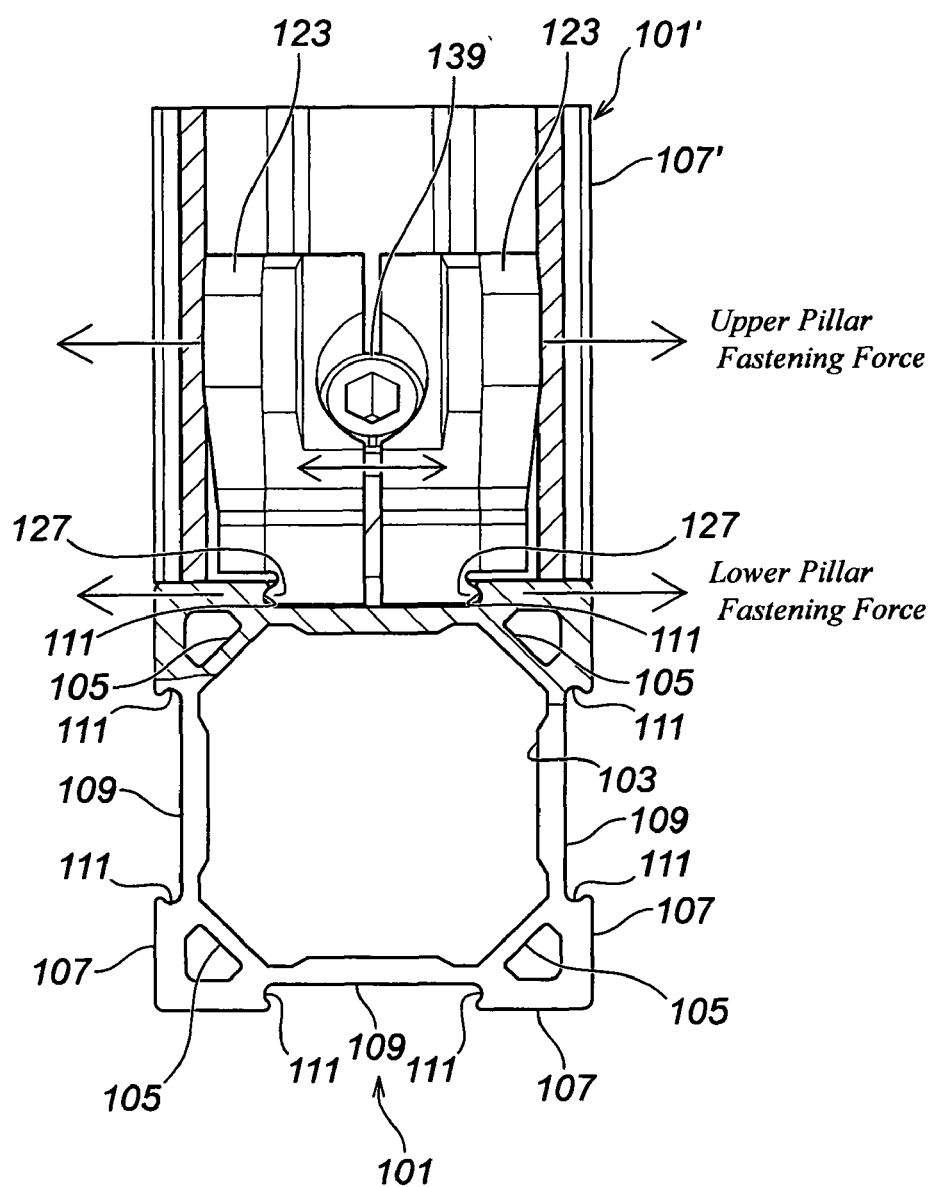
FIG. 12 A front section view showing the joint state in which the end face of the other pillar has been abutted against the side face of the one pillar, and also showing a function, according to the second embodiment of the present invention.

As illustrated in FIG. 9, FIG. 10 and FIG. 12, there is a pair of fastening members 123, 123, facing oppositely to each other in the other pillar 101'. The pair of fastening members 123, 123 is positioned to be movable in the widthwise direction of the groove 109. This groove 109 has been selected arbitrarily among those formed in the side faces 107 of the one pillar 101. There are guide surfaces 125, 125, respectively formed on the bottom surface of each of the pair of fastening members 123, 123, as shown in FIG. 9, FIG. 10 and FIG. 12. The guide surfaces 125, 125 become in slidable contact with the bottom surface of the groove 109. As also illustrated in FIG. 9, FIG. 10 and FIG. 12, there are engagement projections 127, 127 respectively positioned at the bottom as well as at the outer end of the fastening members 123, 123. These engagement projections 127, 127 become in engagement with the engagement recesses 111, 111 of the groove 109 as discussed above.

Each of the outer shape of the pair of fastening members 123, 123 has been formed so as fit to the inner shape of a cavity 103' of the other pillar 101'.

Further, as illustrated in FIG. 9. FIG. 10 and FIG. 12, there is a pair of nuts 131, 131 between the pair of fastening members 123, 123. The pair of nuts 131, 131 has taper surfaces 133, 133, respectively. The tilt angle α° of the taper surface 133 has been set to 20°.

However, this tilt angle is merely for an example purpose, and not limited to this value.

There are attachment recesses 135, 135 formed in the pair of fastening members 123, 123, for attaching the nuts 131, 131 respectively. The pair of nuts 131, 131 has female screws 137, 137 respectively.

There is a bolt 139 to be engaged with the female screws 137, 137 of the pair of nuts 131, 131. When the bolt 139 becomes in engagement with the female screw 137, 137 of the pair of nuts 131, 131, the nut 131, which has been positioned on the removed side from the bolt 139, moves closer to the bolt 139. Thus, a force is applied to the pair of nuts 131, 131 to move in the outward direction, through interaction between taper surfaces 133, 133 of the nuts 131, 131.

When the force is applied to the pair of nuts 131, 131 to move in the outward direction, the pair of fastening members 123, 123, positioned at still outside of the pair of nuts 131, 131, is forced respectively to move in the outward direction. When the force is applied to the pair of fastening members 123, 123 to move in the outward direction, the engagement projections 127, 127 of the pair of fastening members 123, 123 become in engagement with the engagement recesses 111, 111 of the groove 109. Thus the strong joint state may be obtained.

The function of the second embodiment will now be explained with reference to the structure as discussed above.

Figure 11:
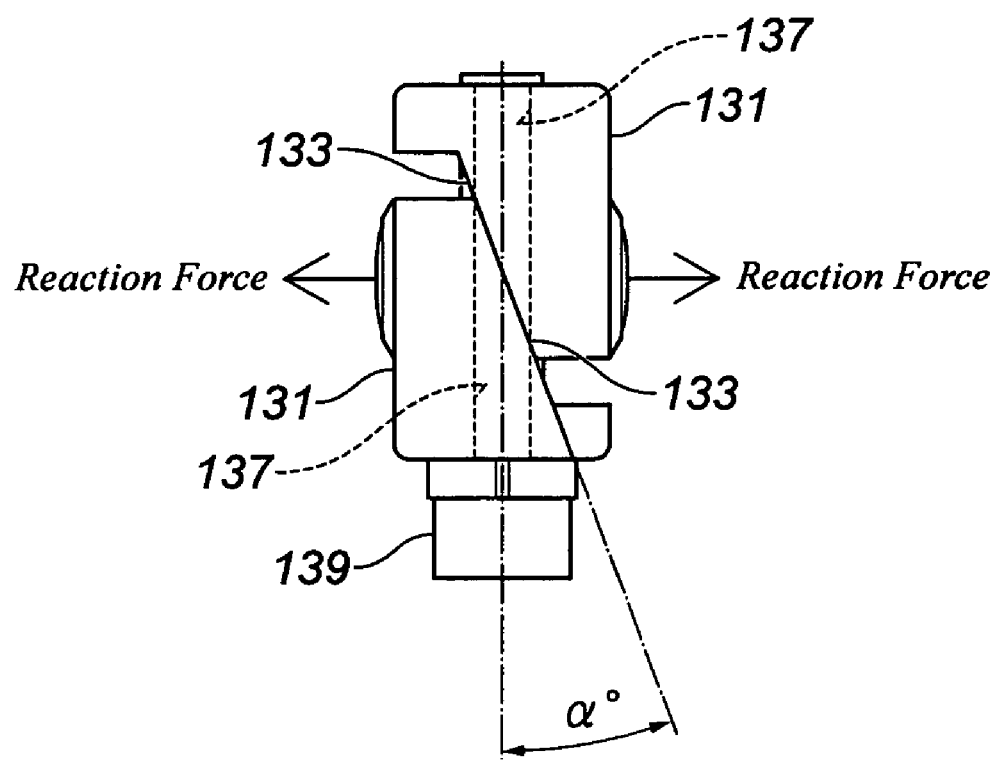
FIG. 11 A front view showing a structure of a pair of nuts according to the second embodiment of the present invention.

First, as illustrated in FIG. 10 and FIG. 11, the bolt becomes in engagement, not fully but to some extent, with the pair of nuts 131, 131, so that the integral unit may be assembled. Thereafter, as illustrated in FIG. 10, the pair of fastening members 123, 123, the integrally assembled pair of nuts 131, 131 as discussed above, and the bolt 139, are placed on the groove 109 of the side face 107 of the one pillar 101. Then the other pillar 101' is placed, so as to conceal the pair of fastening members 123, 123, the integrally assembled pair of nuts 131, 131, and the bolt 139.

Figure 7:
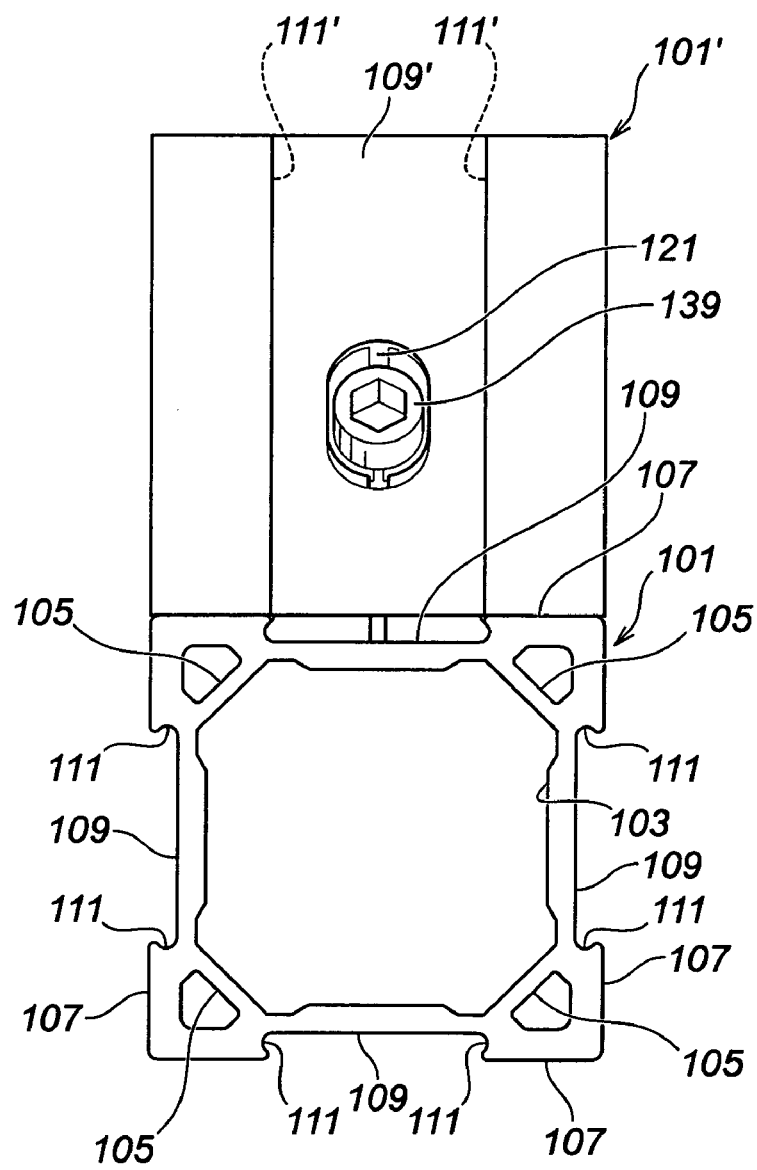
FIG. 7 A front view showing a joint state in which an end face of another pillar has been abutted against a side face of one pillar, according to a second embodiment of the present invention.
Figure 8:
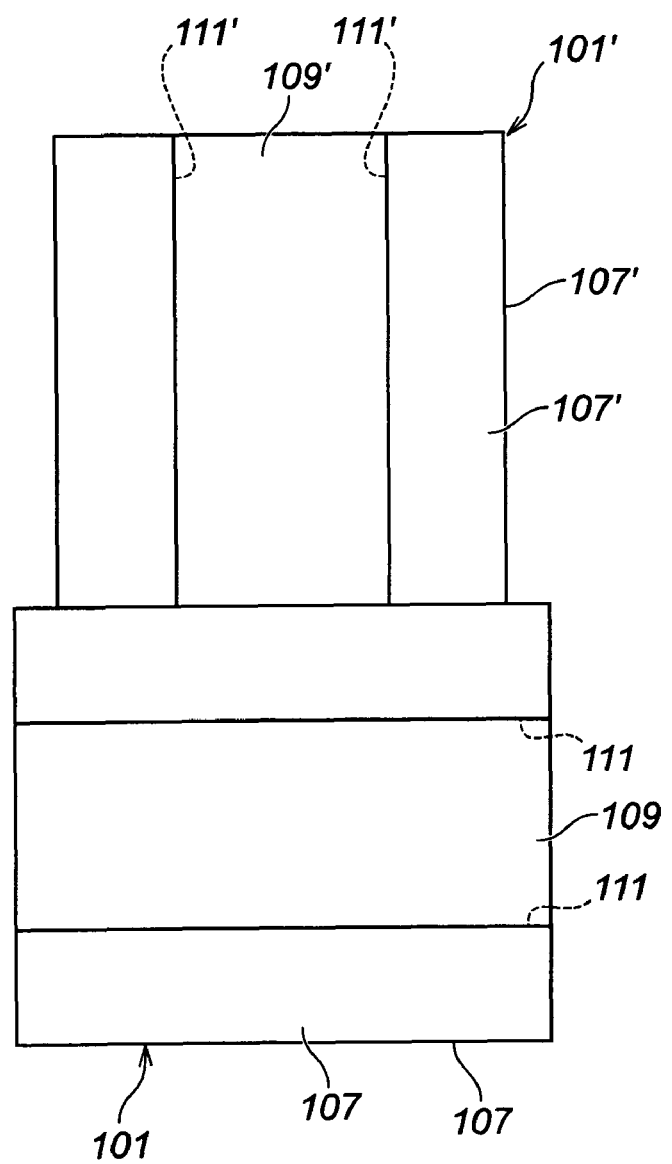
FIG. 8 A side view showing the joint state in which the end face of the other pillar has been abutted against the side face of the one pillar, according to the second embodiment of the present invention.

After the above work, the outer state will become as that shown in FIG. 7. Then, through the opening 121 formed in the other pillar 101', the bolt 139 is further engaged with the pair of nuts 131, 131, by using an unillustrated fitting tool. Thus, as illustrated in FIG. 11, the nut 131, which has been positioned on the removed side from the bolt 139, moves closer to the bolt 139. At that time, through interaction between the taper surfaces 133, 133 of the pair of nuts 131, 131, the force is applied to the pair of nuts 131, 131 to move in the outward direction.

When the force is applied to the pair of nuts 131, 131 to move in the outward direction, the pair of fastening members 123, 123, positioned at still outside of the pair of nuts 131, 131, is forced respectively to move in the outward direction. Accordingly, the force is applied to the pair of fastening members 123, 123 to move in the outward direction, in a state that the guide surfaces 125, 125 are in slidable contact with the bottom surface of the groove 109. Thus, the engagement projections 127, 127 of the pair of fastening members 123, 123 become in engagement with the engagement recesses 111, 111 of the groove 109, whereby the strong joint state may be obtained.

The present embodiment has the following merits.

First, a desired joint state can be obtained by using less number of parts. In particular, the desired joint state can be obtained by using the pair of fastening members 123, 123, the pair of nuts 131, 131, and the bolt 139, which may contribute to easier parts management and lower cost.

The bolt 139 which has been in engagement with the pair of nuts 131, 131, and the pair of fastening members 123, 123, are placed on the groove 109, and then, concealed by the other pillar 101'. Thereafter, a desired joint state can be obtained by simple engagement of the bolt 139 through the opening 121 of the other pillar 101'. Thus the joint work may be facilitated, and the reduction of labor and time can be accomplished.

Further, because the bolt 139 which has been in engagement with the pair of nuts 131, 131, and the pair of fastening members 123, 123, are placed on the groove 109, and then, concealed by the other pillar 101', the stable condition during joint work can be secured.

The interaction between the taper surfaces 133, 133 of the pair of nuts 131, 131, as well as the engagement of the engagement projections 127, 127 of the pair of fastening members 123, 123, with the engagement recesses 111, 111 of the groove 109, serves for strong joint state to each other.

There are the attachment recesses 135, 135 formed in the pair of fastening members 123, 123, for attaching the pair of nuts 131, 131 respectively. Therefore, there is no risk of misalignment between the positions of the pair of fastening members 123, 123 and those of the pair of nuts 131, 131, whereby the desired effect as discussed above can be obtained more securely.

The present invention is not limited to the first and second embodiments as discussed above.

For example, the shape of the pair of fastening members or nuts is not limited to those disclosed in the drawings.

Further, the structure of each part may be modified in various manners as long as they are within the scope of the present invention.

INDUSTRIAL APPLICABILITY

The present invention relates to a structural member joint structure for joining, for example, one pillar and another pillar to each other, in a form that the end face of other pillar is vertically abutted against a side face of the one pillar. In particular, the present invention relates to the structural member joint structure, which can easily join members to each other by using a simple structure having a reduced number of parts, and which can provide the members with a large fastening force so as to make the members less likely to be loosened from each other. For example, the present invention is suitable for constructing machine tool rack, by vertically abutting the other aluminum pillar against the side face of the one aluminum pillar, so that each pillar may join to each other.

The invention claimed is:

1. A structural member joint structure configured to join a first pillar and a second pillar to each other when said second pillar is vertically abutted against a side face of said first pillar, the structural member joint structure comprising:
   a nut mechanism positioned inside of said second pillar and also positioned between a pair of fastening members;
   a bolt operated from an outside through an opening formed in said second pillar to be engaged with said nut mechanism; and
   a pair of intermediate forcing members positioned inside of said second pillar and also positioned between said pair of fastening members,
   wherein said nut mechanism comprises:
      said pair of fastening members positioned inside of said second pillar and arranged so as to be movable in a widthwise direction of a groove formed in the side face of said first pillar, said pair of intermediate forcing members respectively including taper surfaces, said taper surfaces facing a pair of taper surfaces of each of said pair of fastening members, and also including a second taper surface so as to be facing each other oppositely; and
      a nut positioned between said pair of intermediate forcing members, and including a pair of taper surfaces respectively facing said second taper surface of each of said pair of intermediate forcing members,
   wherein a rotation of said bolt causes said nut mechanism to force said pair of intermediate forcing members to move in a direction in which said pair of intermediate forcing members is separated from each other and to force said pair of fastening members in a direction in which said pair of fastening members is separated from each other, whereby engage projections, respectively arranged on ends of said pair of fastening members, move to be engaged with engagement recesses respectively arranged at widthwise opposite ends of said groove in said first pillar, to join said first pillar and said second pillar to each other,
   wherein said nut moves closer to said bolt by engagement of said bolt with said nut, whereby a force is applied to said pair of intermediate forcing members to move in the direction in which said pair of intermediate forcing members is separated from each other through an interaction between said taper surfaces of said nut and said taper surfaces of said pair of intermediate forcing members, and
   wherein said movement of said pair of intermediate forcing members in the direction to be separated from each other forces said pair of fastening members to move in the direction in which said pair of fastening members is separated from each other through said interaction between said taper surfaces of said pair of intermediate forcing members and said taper surfaces of said pair of fastening members.

2. The structural member joint structure as claimed in claim 1, wherein said pair of intermediate forcing members moves in a lengthwise direction along said second pillar, whereby said pair of fastening members moves in a widthwise direction along said groove.

3. The structural member joint structure as claimed in claim 2, wherein each of said pair of intermediate forcing members includes guide grooves, and
   wherein said nut includes guides to be in movable engagement with said guide grooves.

4. The structural member joint structure as claimed in claim 2, wherein each of said pair of fastening members includes a concave part,
   wherein said taper surfaces of said pair of fastening members are formed in an inside of said concave part, and
   wherein said pair of intermediate forcing members and said nut are received in said concave part.

5. The structural member joint structure as claimed in claim 1, wherein each of said pair of intermediate forcing members includes guide grooves, and
   wherein said nut includes guides to be in movable engagement with said guide grooves.

6. The structural member joint structure as claimed in claim 5, wherein each of said pair of fastening members includes a concave part,
   wherein said taper surfaces of said pair of fastening members are formed in an inside of said concave part, and
   wherein said pair of intermediate forcing members and said nut are received in said concave part.

7. The structural member joint structure as claimed in claim 1, wherein each of said pair of fastening members includes a concave part,
   wherein said taper surfaces of said pair of fastening members are formed inside of said concave part, and
   wherein said pair of intermediate forcing members and said nut are received in said concave part.

8. A joining apparatus, comprising:
a first pillar, the first pillar comprising four side faces, each side face comprising a groove, each groove comprising engagement recesses formed therein, and an interior of the first pillar comprising an interior cavity, the interior cavity being formed as elongated in a lengthwise direction of the first pillar;
a second pillar, the second pillar having a hole defined therein, the second pillar comprising four side faces, each side face comprising a groove, each groove comprising engagement recesses formed therein, and an interior of the second pillar comprising an interior cavity, the interior cavity being formed as elongated in a lengthwise direction of the second pillar;
a first fastening member comprising a first engagement projection formed thereon at a bottom portion of the first fastening member, the first engagement projection configured to engage a respective engagement recess of a first respective groove of the second pillar;
a second fastening member comprising a second engagement projection formed thereon at a bottom portion of the second fastening member, the second engagement projection configured to engage a respective engagement recess of a second respective groove of the second pillar;
a bolt provided through the hole of the second pillar;
a nut configured to interact with the bolt;
a first intermediate forcing member formed between the first fastening member and the second fastening member, the first intermediate fastening member being configured to interact with the nut to be driven in the lengthwise direction of the second pillar when the bolt is rotated in a first rotation direction to drive the first fastening member and the second fastening member apart from each other; and
a second intermediate forcing member formed between the first fastening member and the second fastening member, the second intermediate fastening member being configured to interact with the nut to be driven in the lengthwise direction of the second pillar opposite to the first intermediate member when the bolt is rotated in the first rotation direction to drive the first fastening member and the second fastening member apart from each other,
wherein the nut comprises a first taper surface and a second taper surface, the first taper surface configured to interact with a third taper surface of the first intermediate fastening member and the second taper surface configured to interact with a fourth taper surface of the second intermediate fastening member,
wherein the first intermediate fastening member comprises a fifth taper surface to engage a sixth taper surface of the first fastening member and a seventh taper surface to engage an eight taper surface of the second fastening member, and
wherein the second intermediate fastening member comprises a ninth taper surface to engage a tenth taper surface of the first fastening member and an eleventh taper surface to engage a twelfth taper surface of the second fastening member.

9. The joining apparatus according to claim 8, wherein the first fastening member comprises a first recess formed therein configured to restrain the bolt, and
wherein the second fastening member comprises a second recess formed therein to house and restrain the nut.

10. The joining apparatus according to claim 8, wherein the bolt is configured to pull the nut in a direction towards the bolt when rotated in the first rotation direction to force the first intermediate forcing member away from the second intermediate forcing member to thereby force the first fastening member away from the second fastening member to engage the interior cavity of the second pillar into a position in which the first engagement projection engages the first respective engagement recess of the first pillar and in which the second engagement projection engages the second respective engagement recess of the first pillar.

11. A fastening apparatus, comprising:
a bolt;
a nut configured to interact with the bolt,
a first intermediate forcing member, the first intermediate fastening member being configured to interact with the nut to be driven along a first axis in a first direction when the bolt is rotated in a first rotation direction;
a second intermediate forcing member configured to interact with the nut to be driven along the first in a second direction opposite to the first intermediate member when the bolt is rotated in the first rotation direction;
a first fastening member configured to receive a portion of the first intermediate forcing member and a portion of the second intermediate forcing member, the first fastening member being configured to be driven along a second axis perpendicular to the first axis in a third direction by the first intermediate forcing member and the second intermediate forcing member when the bolt is rotated in the first rotation direction, the first fastening member comprising a first engagement projection formed thereon at a bottom portion of the first fastening member, the first engagement projection configured to engage a respective engagement recess of a first respective groove of a pillar; and
a second fastening member configured to receive a portion of the first intermediate forcing member and a portion of the second intermediate forcing member, the first fastening member being configured to be driven along the second axis in a fourth direction opposite to the first fastening member by the first intermediate forcing member and the second intermediate forcing member when the bolt is rotated in the first rotation direction, the second fastening member comprising a second engagement projection formed thereon at a bottom portion of the second fastening member, the second engagement projection configured to engage a respective engagement recess of a second respective groove of the pillar,
wherein the nut comprises a first taper surface and a second taper surface, the first taper surface configured to interact with a third taper surface of the first intermediate fastening member and the second taper surface configured to interact with a fourth taper surface of the second intermediate fastening member,
wherein the first intermediate fastening member comprises a fifth taper surface to engage a sixth taper surface of the first fastening member and a seventh taper surface to engage an eight taper surface of the second fastening member, and
wherein the second intermediate fastening member comprises a ninth taper surface to engage a tenth taper surface of the first fastening member and an eleventh taper surface to engage a twelfth taper surface of the second fastening member.

12. The fastening apparatus according to claim 11, wherein the first intermediate forcing member, the second intermediate forcing member, the first fastening member, and the second fastening member are configured to be placed inside an interior of a second pillar.

* * * * *